United States Patent [19]

Ninomiya

[11] Patent Number: 4,785,358

[45] Date of Patent: * Nov. 15, 1988

[54] RECORDING APPARATUS FOR RECORDING A VIDEO SIGNAL OBTAINED FROM A HIGH SPEED SCANNING VIDEO CAMERA

[75] Inventor: Takeshi Ninomiya, Kanagawa, Japan

[73] Assignee: Sony Corporation, Tokyo, Japan

[*] Notice: The portion of the term of this patent subsequent to Sep. 30, 2003 has been disclaimed.

[21] Appl. No.: 88,502

[22] Filed: Aug. 19, 1987

Related U.S. Application Data

[63] Continuation of Ser. No. 591,976, Mar. 21, 1984, abandoned.

[30] Foreign Application Priority Data

Mar. 25, 1983 [JP] Japan ................................. 58-49761
Apr. 8, 1983 [JP] Japan ................................. 58-62703

[51] Int. Cl.$^4$ .......................................... H04N 5/782
[52] U.S. Cl. .................................. 358/335; 358/338; 360/9.1; 360/10.1; 360/22; 360/33.1
[58] Field of Search ............... 358/310, 320, 326, 329, 358/335, 338, 346, 347, 213, 906; 360/9.1, 10.3, 22, 23, 33.1, 36.2, 8, 10.1, 24

[56] References Cited

U.S. PATENT DOCUMENTS

| | | | |
|---|---|---|---|
| 3,806,640 | 4/1974 | Furukawa | 360/23 |
| 3,860,952 | 1/1975 | Tallent et al. | 358/326 X |
| 3,900,885 | 8/1975 | Tallent et al. | 358/339 X |
| 4,163,256 | 7/1979 | Adcock | 358/906 X |
| 4,222,078 | 9/1980 | Bock | 360/9.1 |
| 4,280,151 | 7/1981 | Tsunekawa et al. | 360/33.1 X |
| 4,330,796 | 5/1982 | Anagnostopoulos | 358/906 X |
| 4,339,775 | 7/1982 | Lenke et al. | 360/10.3 |
| 4,458,271 | 7/1984 | Horstmann | 358/310 |
| 4,460,924 | 7/1984 | Lippel | 358/310 |
| 4,467,368 | 8/1984 | Horstmann | 358/334 |
| 4,471,388 | 9/1984 | Dishert | 358/906 X |
| 4,472,745 | 9/1984 | Foerster et al. | 358/310 |
| 4,507,686 | 3/1985 | Kimura | 358/310 |
| 4,510,538 | 4/1985 | Sato et al. | 360/9.1 X |
| 4,584,613 | 4/1986 | Amai et al. | 358/906 X |
| 4,614,980 | 9/1986 | Ninomiya et al. | 360/22 X |

FOREIGN PATENT DOCUMENTS

| | | |
|---|---|---|
| 0364393 | 10/1981 | Austria . |
| 0072507 | 2/1983 | European Pat. Off. . |
| 0120696 | 3/1984 | European Pat. Off. . |
| 2745337 | 4/1979 | Fed. Rep. of Germany . |
| 1474487 | 8/1979 | Fed. Rep. of Germany . |
| 1557608 | 12/1979 | United Kingdom . |

OTHER PUBLICATIONS

"Overview of time-base correction techniques and their applications" Saclashige SMPTE journal, vol. 85, No. 10, 787-791, 1976.

Primary Examiner—Aristotelis M. Psitos
Attorney, Agent, or Firm—Lewis H. Eslinger; Donald S. Dowden

[57] ABSTRACT

A recording apparatus includes a memory circuit for storing a video signal derived from a high speed scanning video camera the scanning speed of which is faster than the scanning speed of a standard television signal and a plurality of rotating magnetic heads supplied with video signals of a plurality of channels which are read out in parallel from the memory circuit. The video signals of the plurality of channels are recorded on a magnetic tape by the plurality of rotating magnetic heads so as to sequentially form slant adjoining tracks.

5 Claims, 14 Drawing Sheets

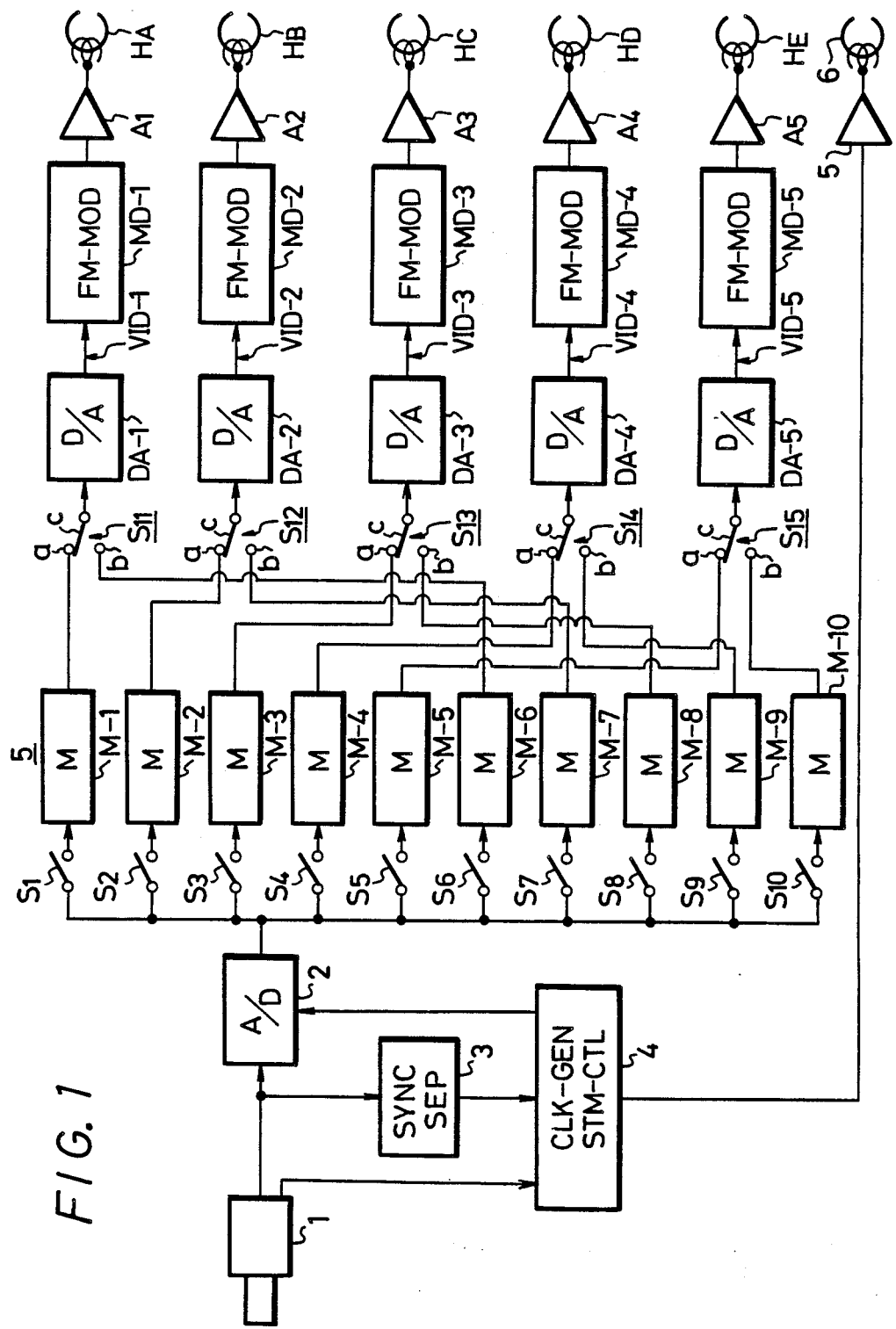

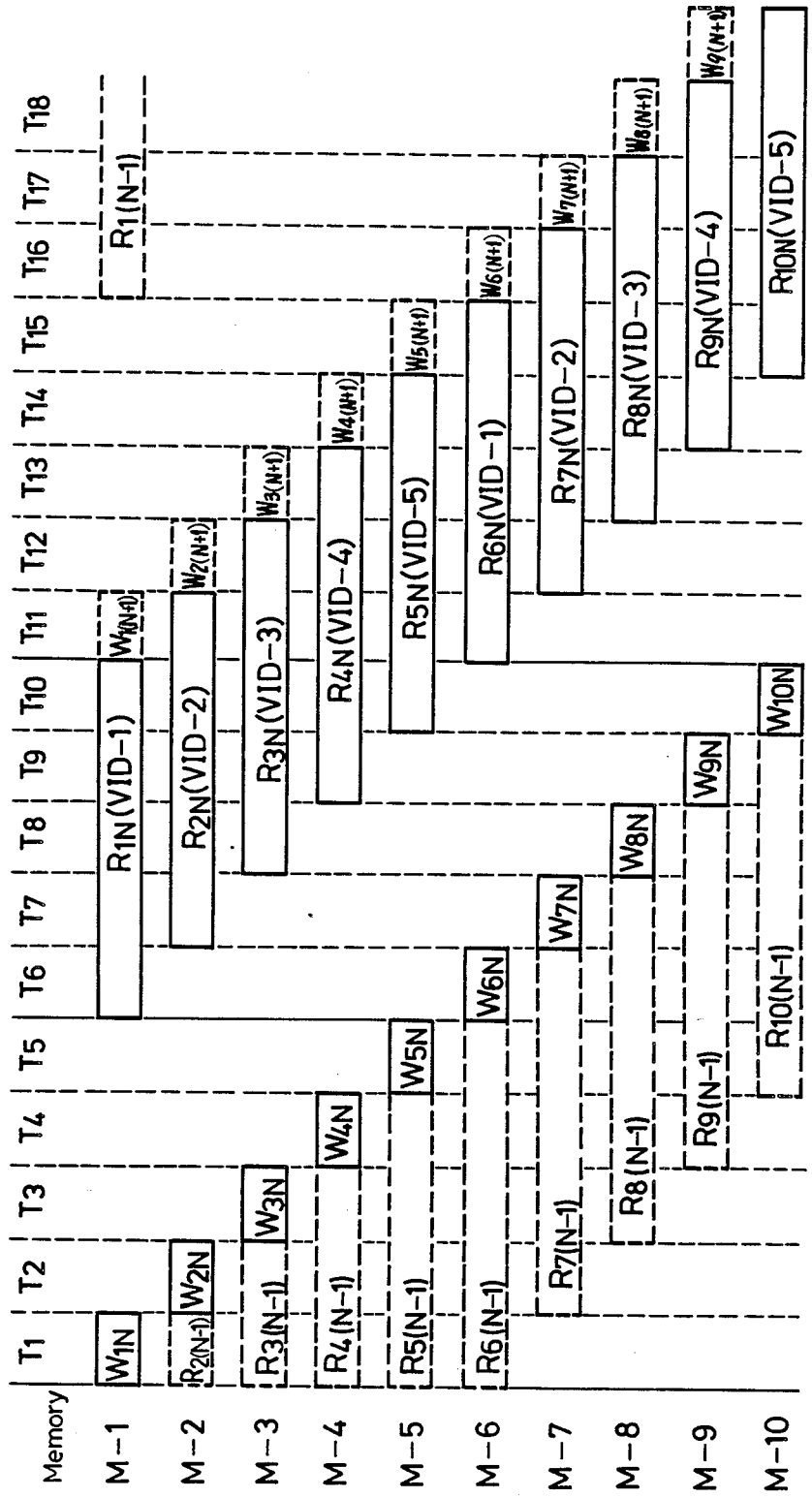

FIG. 8

| | T1 | T2 | T3 | T4 | T5 | T6 | T7 | T8 | T9 | T10 | T11 | T12 | T13 | T14 | T15 | T16 | T17 | T18 |
|---|---|---|---|---|---|---|---|---|---|---|---|---|---|---|---|---|---|---|
| M-1 | W1N | R1N(VID-1) | | | | | W1(N+1) | R1(N+1)(VID-2) | | | | | W1(N+2) | R1(N+2)(VID-3) | | | | |
| M-2 | | W2N | R2N(VID-2) | | | | | W2(N+1) | R2(N+1)(VID-3) | | | | | W2(N+2) | R2(N+2)(VID-4) | | | |
| M-3 | | | W3N | R3N(VID-3) | | | | | W3(N+1) | R3(N+1)(VID-4) | | | | | W3(N+2) | R3(N+2)(VID-5) | | |
| M-4 | | | | W4N | R4N(VID-4) | | | | | W4(N+1) | R4(N+1)(VID-5) | | | | | | | |
| M-5 | | | | | W5N | R5N(VID-5) | | | | | W5(N+1) | R5(N+1)(VID-1) | | | | | | |
| M-6 | | | | | | W6N | R6N(VID-1) | | | | | W6(N+1) | R6(N+1)(VID-2) | | | | | |

RECORDING APPARATUS FOR RECORDING A VIDEO SIGNAL OBTAINED FROM A HIGH SPEED SCANNING VIDEO CAMERA

This is a continuation of application Ser. No. 6/591,976 filed Mar. 21, 1984 now abandoned.

BACKGROUND OF THE INVENTION

1. Field of the Invention

The present invention generally relates to a recording apparatus for recording a video signal and more particularly is directed to a recording apparatus for recording a video signal obtained from a high speed scanning video camera which can pick up and record a phenomenon moving at high speed by using a television camera and a VTR (video tape recorder).

2. Description of the Prior Art

In the prior art, a high speed film camera is proposed as an apparatus for picking up and recording a phenomenon moving at high speed. This high speed film camera, however, has a defect that the phenomenon moving at high speed, which is recorded by such camera, can not be reproduced immediately. To remove the above defect, various researches and technical developments have been made in which a phenomenon moving at high speed is picked up by a television camera, recorded by a VTR or the like, and then reproduced immediately.

As is known well, it takes 1/60 second at minimum for an ordinary television camera to convert one sheet of picture to an electrical signal. Accordingly, it is impossible for the television camera to pick up a moving object which changes at a speed faster than 1/60 second. To solve this problem, a technique is disclosed in, for example, the publication document of the Japanese patent application examined, No. 26416/1977, in which the visual field of a pickup tube is divided into a plurality of sections, the whole of an object is placed in each one section of the divided sections and the object image on the pickup tube is scanned during the scanning period of time corresponding to each section to thereby enable the phenomenon moving at high speed to be picked up.

Further, in the published document of the Japanese patent application examined, No. 13631/1980, there is disclosed a technique in which the optical image of an object is sequentially projected onto a plurality of pickup tubes having accumulation effect at every constant interval during a constant time period, and the video signals from the respective pickup tubes are respectively supplied to a plurality of recording apparatus to thereby successively record the time image of the phenomemon moving at high speed.

In addition, in the publication document of the Japanese patent application unexamined, No. 2119/1977, there is disclosed a technique in which two image pickup elements or imagers are employed and the deflections thereof are mutually displaced by every ½ frame to thereby produce a video signal of high speed twice the frame speed.

However, according to the technique disclosed in the published document of the Japanese patent application examined, No. 26416/1977, since the visual field is substantialy narrowed, only the image of the periphery of the moving object is obtained. Also since the movable range of the moving object is confined within the divided one section, this technique is not suitable for the general use. According to the technique disclosed in the published document of the Japanese patent application examined, No. 13631/1980, since a plurality of image elements having accumulation effect and a plurality of recording apparatus are required, the arrangement thereof becomes complicated, which then becomes significantly inconvenient in practical use. Furthermore, according to the technique disclosed in the publication document of the Japanese patent application unexamined, No. 2119/1977, since this technique requires a plurality of image pickup elements and the recorded pattern on a magnetic tape becomes special, the recorded tape has no compatibility.

In addition, it may be considered that a video signal picked up by the television camera at a scanning speed a plurality of times (N) higher than the ordinary scanning speed is recorded as it is by using the VTR. In that case, it is necessary to set the revolution number of the rotation drum of the tape guide drum at N times the standard value and to set the tape transport speed at N times the standard value. This, however, will cause the following problems.

(1) In order to cause the tape guide drum to rotate at a revolution number N times the standard revolution number, it is necessary to set the carrier frequency of FM-modulation (frequency-modulation) and the base band frequency both N times higher than the standard values. However, in this case, although the signal recorded at the speed N times the standard value must be reproduced at the normal speed, it is quite difficult to secure the corresponding relation between the emphasis and deemphasis and the characteristics of the recording and reproducing circuits with the frequency stability or the like of the frequency-modulated signal frequency. In addition, the recorded tape has no compat- ibility.

(2) Since the frequency-modulated carrier frequency becomes N times the normal value, considering the impedance of the rotation magnetic head, the characteristic of the rotary transformed and so on, it is quite difficult to increase the value N.

(3) If the revolution number of the rotation drum of the tape guide drum is set to N times the normal value, there is some fear that the contact pressure of the rotation magnetic head for the magnetic tape is lowered by a so-called air film to lower the recording sensitivity.

OBJECTS AND SUMMARY OF THE INVENTION

Accordingly, it is an object of the present invention to provide an improved recording apparatus for recording a video signal obtained from a high speed scanning video camera.

It is another object of the present invention to provide a recording apparatus for recording a video signal obtained from a high speed scanning video camera which can easily pick up and record a phenomenon moving at high speed by using a television camera and a VTR (video tape recorder).

It is a further object of the present invention to provide a recording apparatus for recording a video signal obtained from a high speed scanning video camera which is compatible with the VTR of a standard type or C-format of the SMPTE (society of motion picture and television engineers).

According to one aspect of the present invention, there is provided a recording apparatus for recording a video signal obtained from a high speed scanning video camera which comprises a memory means for storing therein a video signal derived from a high speed scanning video camera the scanning speed of which is faster than the scanning speed of the standard television signal and a plurality of rotation magnetic heads supplied with the video signals of a plurality of channels read out in parallel from the memory means wherein the video signals of the plurality of channels are recorded on the magnetic tape by the plurality of rotation magnetic heads so as to form adjoining slant tracks sequentially According to the present invention, it is possible to obtain a recording apparatus for recording a video signal obtained from a high speed scanning video camera which can easily pick up and record the phenomenon moving at high speed by using a television camera and a VTR and the recorded tape of which can be reproduced by a conventional VTR of SMPTE standard type (C format).

The other objects, features and advantages of the present invention will become apparent from the following description taken in conjunction with the accompanying drawings through which the like references designate the same elements and parts.

BRIEF DESCRIPTION OF THE DRAWINGS

FIG. 1 is a block diagram showing an embodiment of the recording apparatus for recording a video signal obtained from a high speed scanning video camera according to the present invention;

FIG. 2 is a timing chart of write and read timings of a memory useful for explaining the operation of the recording apparatus shown in FIG. 1;

FIG. 8 is a timing chart of write and read timings of a memory useful for explaining the recording apparatus shown in FIG. 7;

DESCRIPTION OF THE PREFERRED EMBODIMENTS

Figure 3A:
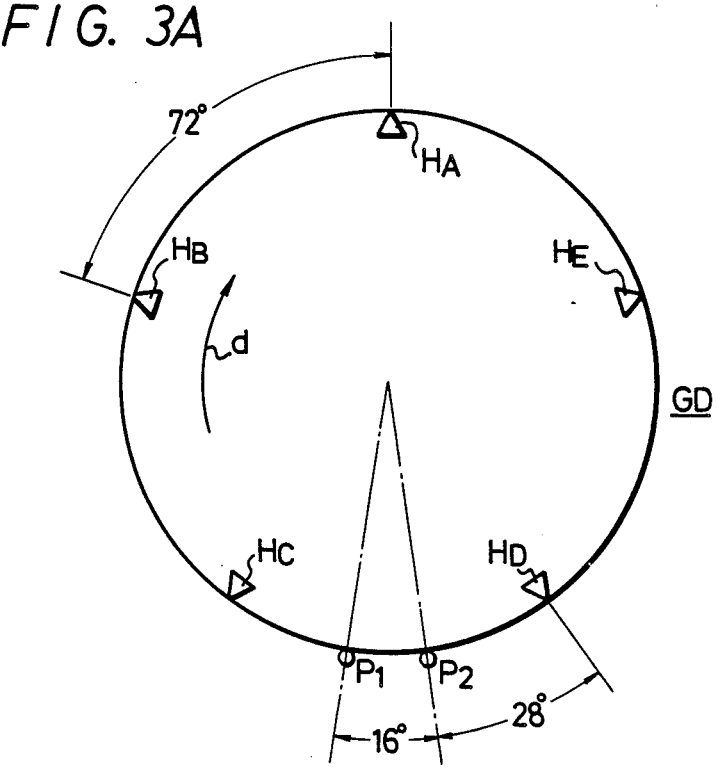
FIGS. 3A and 3B are respectively plan and side views illustrating a tape guide drum used in the recording apparatus shown in FIG. 1.

An embodiment of the recording apparatus for recording a video signal obtained from a high speed scanning video camera according to the present invention will hereinafter be described with reference to FIG. 1. This embodiment of the recording apparatus according to the present invention employs an image pickup apparatus or high speed scanning video camera the scanning speed of which is five times the scanning speed of a standard television signal of an NTSC (national television systems committee) system.

If a subcarrier frequency, a horizontal frequency, a vertical frequency and a frame frequency of the video signal are respectively taken as $f_{sc}$, $f_H$, $f_V$ and $f_{FR}$, they are expressed as follows:

$$f_{sc} = \frac{910}{4} f_H = 17.9 \text{ (MHz)}$$

$$f_H = \frac{525}{2} f_V = 78.75 \text{ (kHz)}$$

$$f_V = 300 \text{ (Hz)}$$

$$f_{FR} = \frac{1}{2} f_V = 150 \text{ (Hz)}$$

In FIG. 1, a reference numeral 1 designates an image pickup apparatus or video camera which includes an image element such as a picture tube, a solid state image pickup element or the like and a driving means, a signal processing circuit and the like corresponding thereto. In this embodiment, the imager 1 also includes an encoder to produce a composite color video signal of the NTSC system. Such encoder, however, can be provided at a signal processing circuit system at the latter stage of the video camera 1 (at the next stage of, for example, D/A (digital-to-analog) converter which will be described later).

The composite color video signal from the video camera 1 is supplied to an A/D (analog-to-digital) converter 2 and thereby digitized. A reference numeral 3 designates a synchronizing signal separating circuit 3 which receives the video signal from the video camera 1 to separate therefrom various synchronizing signals. A color framing signal from the video camera 1 and horizontal and vertical synchronizing signals from the synchronizing signal separating circuit 3 are supplied to a clock signal generating/system control circuit 4. A clock signal with frequency $f_{W\text{-}CK}$ of, for example, $4f_{sc}$ (=71.6 MHz) from the circuit 4 is supplied to the A/D converter 2. The control signal from the circuit 4 is supplied through an amplifier 5 to a stationary or fixed magnetic head 6 and thereby recorded on a magnetic tape (not shown) along its side edge.

The digitized video signal from the A/D converter 2 is supplied through on-off switches $S_1$ to $S_{10}$ to a field memory 5 (memories M-1 to M-10) and is thereby written therein with the data rate of the write frequenc $f_{W\text{-}CK}$. The digitized video signals read out from the field memories M-1, M-6; M-2, M-7; M-3, M-8; M-4, M-9; and M-5, M-10 with the data rate of a read frequency $f_{R\text{-}CK}$ (=1/5 $f_{W\text{-}CK}$) are respectively supplied through change-over switches $S_{11}$ to $S_{15}$ (each switch having fixed contacts a, b and a movable contact c) to D/A converters DA - 1 to DA - 5 and thereby converted to the form of analog signals in response to the clock signal with the read frequency $f_{R-CK}$. The analog video signals VID - 1 to VID - 5 from the D/A converters DA - 1 to DA - 5 are supplied to frequency modulators MD - 1 to MD - 5 and thereby frequency-modulated. The frequency-modulated video signals are respectively supplied through amplifiers $A_1$ to $A_5$ to five rotary magnetic heads $H_A$ to $H_E$ and thereby recorded on the magnetic tape to sequentially form slant adjacent tracks.

Each of the frequency modulators MD - 1 to MD - 5 includes means for adjusting the video level, carrier frequency, deviation, differential gain, differential phase, frequency characteristic and the like by which characteristics of respective channels can be made uniform.

The recording apparatus of the invention consists of a television camera and a VTR (video tape recorder) of helical scan system. While in this embodiment, the section from the video camera 1 to the D/A converters DA - 1 to DA - 5 is taken as the television camera side and the section from the frequency modulators MD - 1 to MD - 5 to the rotary magnetic heads $H_A$ to $H_E$, and the amplifier 5 and the fixed magnetic head 6 is taken as the VTR side, the border between the television camera side and the VTR side is not limited to the above.

The operation of the apparatus shown in FIG. 1 will be described with reference to FIG. 2. In FIG. 2, reference letters $T_1$, $T_2$, $T_3$ . . . designate field period, each period having a time width T ($=1/f'_V$).

During the period $T_1$, only the switch $S_1$ is turned on to allow the digitized video signal to be written in the memory M - 1. During the succeeding period $T_2$, only the switch $S_2$ is turned on to allow the video signal to be written in the memory M - 2. In like manner, the image signal is sequentially written in the memories M - 3 to M - 10.

In the field period $T_6$, the movable contact c of the switch $S_{11}$ is connected to the fixed contact a so that a video signal $W_{1N}$ written in the memory M - 1 during the field peñod $T_1$ is started to be read out threfrom. Since $f_{R-CK} = (1/5 f'_{W-CK}$, 5 field periods $T_6$ to $T_{10}$ are required to read the video signal $W_{1N}$ and then to provide a read signal $R_{1N}$.

Similarly in the field period $T_7$, the video signal $W_{2N}$ written in the memory M - 2 during the field period $T_2$ is started to be read out. In like manner, 5 field periods $T_7$ to $T_{11}$ are required to read the video signal $W_{2N}$ and to provide a read signal $R_{2N}$. The same operation is carried out hereinafter. In the field period $T_{11}$, the movable contact c of the switch $S_{11}$ is connected to the fixed contact b so that the video signal $W_{6N}$ stored in the memory M - 6 is started to be read out therefrom and thus a read signal $R_{6N}$ is obtained. Accordingly, if the written digital video signals $W_{1N}$, $W_{2N}$, . . . are controlled to have one field period from the beginning of each field, the read video signals $R_{1N}$, $R_{2N}$ . . . become the same as they are read out from the beginning of each field so that the D/A converters DA - 1 to DA - 5 generate the analog video signals VID - 1 to VID - 5 which have 5 phases with a phase interval of $1/f'_V = 1/5 \cdot 1/f_V$ between adjacent ones.

Figure 3B:
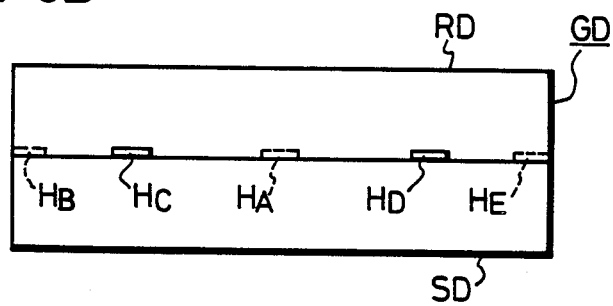

The video signal VID - 1 consists of the video signals $R_{1N} \rightarrow R_{6N} \rightarrow R_{1(N+1)} \rightarrow$ . . . which are sequentially read. If, now, $W_{1N}$ is taken as the video signal of NTSC system in the first field, $W_{2N}$ is the video signal in the second field, . . . $W_{4N}$ the video signal in the fourth field, $W_{5N}$ is the video signal in the first field, $W_{6N}$ is the video signal in the second field . . . Thus, the video signal VID - 1 consists of the sequential video signal $R_{1N}$ (first field)$\rightarrow R_{6N}$ (second field)$\rightarrow R_{1(N+1)}$ (third field)$\rightarrow R_{6(N+1)}$ (fourth field)$\rightarrow R_{1(N+2)}$ (first field) . . . Therefore, the video signal VID - 1 becomes the video signal of NTSC system with succession, namely, excellent color framing property. Similarly, the video signals VID - 2 . . . VID - 5 become the sequential video signals of NTSC system. Finally, respective D/A converters produce the video signals of NTSC system with 5 phases. FIGS. 3A and 3B illustrate the arrangement of the respective rotary magnetic heads (record heads) $H_A$ to $H_E$. As shown in FIGS. 3A and 3B, the five rotary magnetic heads $H_A$ to $H_E$ are mounted on a rotary drum RD of a tape guide drum GD with an angular distance of 72° between adjacent ones. The rotary drum RD is rotated, once at every $1/f_V$, namely, at 60 Hz in the clockwise direction. A reference letter SD designates a fixed drum. A record tape (not shown) is wrapped around the tape guide drum GD along its external periphery from points $P_2$ to $P_1$ in the counter-clockwise direction. The tape wrapping angle is approximately 344° and the tape transport speed is five times the standard value $V_2$ of the normal tape transport speed.

Figure 4:
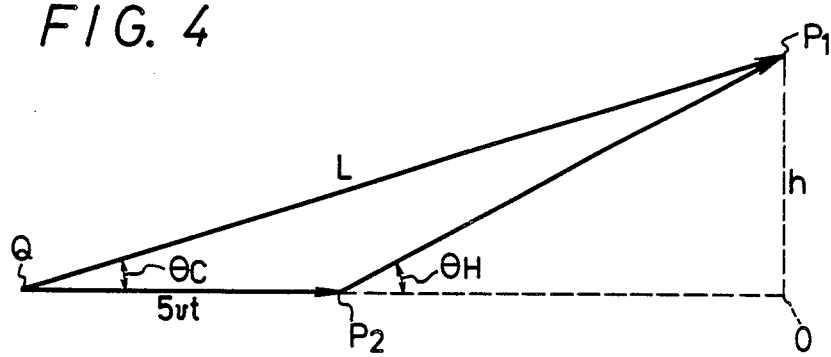
FIGS. 4 and 5 are respectively vector diagrams useful for explaining the recording apparatus shown in FIG. 1.

The tape recorded under the above condition must satisfy all dimensions which are determined by the standard or normalization. In FIG. 4, a recorded track pattern vector $\overrightarrow{QP_1}$ on the tape becomes the sum of a tape transport vector $\overrightarrow{QP_2}$ and a drum rotation vector $\overrightarrow{P_2P_1}$ as expressed in the following equations.

$$\overrightarrow{QP_1} = \overrightarrow{QP_2} + \overrightarrow{P_2P_1}$$

$$\overrightarrow{QP_1}\cos\theta_c - \overrightarrow{P_2P_1}\cos\theta_H = 5vt$$

$$\overrightarrow{QP_1}\sin\theta_c = \overrightarrow{P_2P_1}\sin\theta_H = h$$

where $\theta_c$ and $\theta_H$ respectively represent the track angle and the helix angle.

From the above two equations, $\overline{P_2P_1}$ and $\theta_H$ are determined. By way of example, h, vt and $\overline{QP_1}$ are given as h=18.4 mm, vt=4.07 mm and $\overline{QP_1}$=410.764 mm.

$$\begin{aligned}\overline{P_2P_1} &= \sqrt{h^2 + (\overline{QP_1}\cos\theta_c - 5vt)^2} \\ &= \sqrt{25vt^2 - 10vt\,\overline{QP_1}\cdot\cos\theta_c + \overline{QP_1}^2} \\ &\approx \overline{QP_1}\sqrt{1 - 10\frac{vt}{\overline{QP_1}}\cos\theta_c} \\ \theta_H &= \sin^{-1}\frac{h}{\overline{P_2P_1}}\end{aligned}$$

$\overline{P_2P_1}$ and $\theta_H$ are respectively 390.4357° and 2.70117° (=2°42'04"). Thus, $\theta_H$ is selected to be the inclination angle between the tape and the drum in such a manner that $\overline{P_2P_1}$ may be equal to 344°/360° of the external periphery of the tape guide drum GD.

When reproducing the tape by the VTR of SMPTE (society of motion picture and television engineers) type C, in order to form on the tape a slant track in which the relative speeds of the rotation head and the tape transport speed are coincident with each other, the external diameter of the tape guide drum must be selected smaller than that of the SMPTE type C VTR by a predetermined amount. This will hereinafter be described with reference to FIG. 5.

Figure 5:
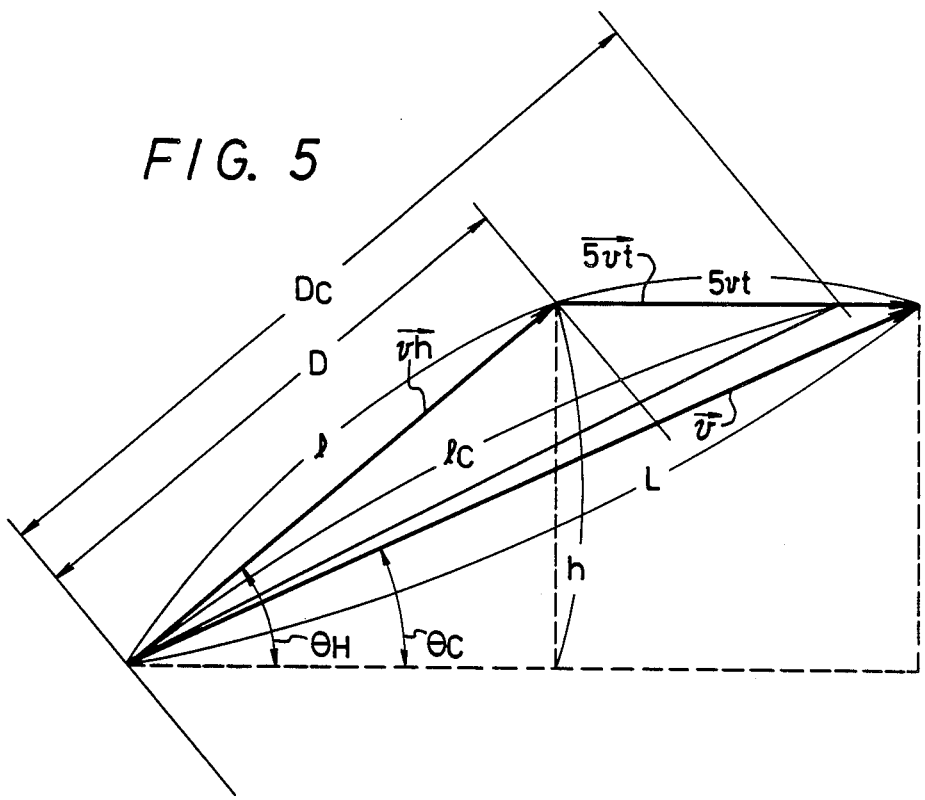

In FIG. 5, a relative speed or velocity $\vec{v}$ between the rotary magnetic head and the tape becomes the sum of a tape transport speed $\vec{5vt}$ (vt is the standard tape running speed or velocity of the tape of the SMPTE type C VTR at normal running) and a linear velocity or speed $\vec{vh}$ of the rotary magnetic head as expressed by the following equation.

$$\vec{v} = \vec{vh} + \vec{5vt}$$

If a length (track length) of a slant track formed on the magnetic tape by the rotary magnetic head upon still playback of the SMPTE type C VTR is taken as lc, the track length lc is expressed by the following equation.

$$lc = \pi Dc \cdot (\phi c / 360)$$

where DC is the external diameter of the tape guide drum of the SMPTE type C VTR and $\phi c$ is the tape wrapping angle thereof ($=340°$).

A track length l of a slant track formed on the tape when the tape transport speed is five times the normal tape speed is expressed as $$l = \pi D \cdot (\phi c / 360)$$

where D is the external diameter of the tape guide drum of the VTR according to the present invention.

Accordingly, $lc^2$ and $l^2$ are respectively expressed by the following equations.

$$lc^2 = h^2 + (L \cos \theta c - vt)^2$$

$$l^2 = h^2 + (L \cos \theta c - 5vt)^2$$

where h is the length of the track on the tape in its width direction and L is the track length on the tape of the SMPTE type C VTR when the tape is transported at speed five times the normal tape speed.

Consequently, Dc/D is expressed as follows:

$$Dc/D = \{h^2 + (L \cos \theta c - vt)^2\}^{\frac{1}{2}} \times \{h^2 + (L \cos \theta c - 3vt)\}^{-\frac{1}{2}}$$

Thus the outer diameter D($<$Dc) of the tape guide drum is selected.

The tape pattern of the tape recorded by the tape guide drum, the rotary magnetic head, the tape transport system and so on, which are determined as above, can satisfy the standards of the SMPTE type C VTR.

Figure 6:
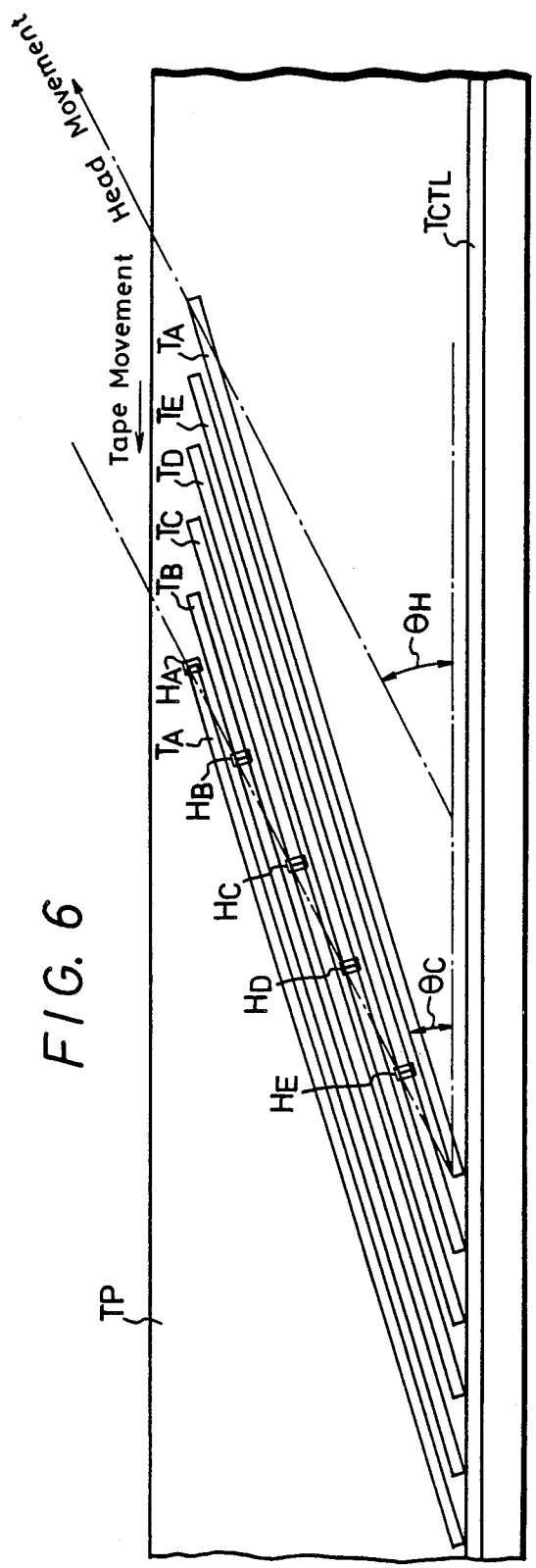
FIG. 6 is a diagram of a recorded pattern on a tape useful for explaining the recording apparatus shown in FIG. 1.

FIG. 6 shows the tape pattern suited for the standard of the SMPTE type C VTR and the positional relation between the rotary magnetic heads $H_A$ to $H_E$ and the corresponding slant tracks. In FIG. 6, a reference letter TP designates a magnetic tape and $T_A$ to $T_E$ slant tracks corresponding to the rotary magnetic heads $H_A$ to $H_E$. A reference letter $T_{CTL}$ designates a control signal track.

When the tape recorded as described above is reproduced by the VTR meeting with the standard of the SMPTE type C format under the normal playback mode, it is possible to reproduce the video picture moving at high speed in the slow motion mode.

Another embodiment of the recording apparatus for recording a video signal obtained from a high speed scanning video camera according to the present invention will be described with reference to FIG. 7. If the switches $S_1$ to $S_{10}$, the memory 5, the switches $S_{11}$ to $S_{15}$ and the D/A converters DA - 1 to DA - 5 are taken as one memory 5', this memory 5' will be modified as follows. By way of example, if a serial memory such as a CCD (charge-coupled device) and a shift register is used, the memory 5'can be formed by six field memories, switches, D/A converters and so on. Like parts corresponding to those in FIG. 1 are marked with the same references and will not be described.

The operation of the memory 5' will be described with reference to FIG. 8. In this case, let it be assumed that the memory 5' includes six field memories M - 1 to M - 6. During the field period $T_1$, the digitized video signal is written in and then stored in the memory M - 1. During the succeeding field period $T_2$, the video signal is written in the memory M - 2. Similarly, the video signal is sequentially written in the memories M - 3 to M - 6 hereinafter. In the field period $T_2$, the video signal $W_{1N}$ written in the memory M - 1 during the field period $T_1$ is started to be read out therefrom. Since $f_R \cdot c_K = (1/5) f_W \cdot c_{K'}$, five field periods $T_2$ to $T_6$ are required to read the video signal $W_{1N}$ and to provide the read signal $R_{1N}$.

Similarly in the field period Thd 3, the video signal $W_{2N}$ stored in the memory M - 2 during the field period $T_2$ is started to be read out therefrom. In like manner, five field periods $T_3$ to $T_7$ are required to read the video signal $W_{2N}$ and to provide the read signal $R_{2N}$. The same operation will be carried out hereinafter. In the field period $T_7$, the movable contact c of the switch $S_{11}$ is connected to the fixed contact b so that the video signal $W_{6N}$ stored in the memory M - 6 is started to be read out therefrom to produce the read signal $R_{6N}$. Accordingly, when the written digital video signals $W_{1N}, W_{2N} \ldots$ are controlled to have one field period from the beginning of each field, the read out video signals $R_{1N}, R_{2N} \ldots$ become the same as those read out from the beginning of each field so that the D/A converters DA - 1 to DA - 5 produce the analog video signals VID - 1 to VID - 5 of 5 phases with a phase interval of $1/f'_V = 1/5 \cdot 1/f_V$ between adjacent ones.

The video signal VID - 1 consists of the video signals $R_{1N} \rightarrow R_{6N} \rightarrow R_{1(N+1)} \rightarrow \ldots$ which are read sequentially. If, now, $W_{1N}$ is taken as the video signal of NTSC system in the first field, $W_{2N}$ is the video signal of the second field, ..., $W_{4N}$ is the video signal of the fourth field, $W_{5N}$ is the video signal of the first field and $W_{6N}$ becomes the video signal of the second field ... Consequently, the video signal VID - 1 consists of the sequential video signals $R_{1N}$ (first field) $\rightarrow R_{6N}$ (second field) $\rightarrow R_{1(N+1)}$ (third field) $\rightarrow R_{6(N+1)}$ (fourth field) $\rightarrow R_{1(N+2)}$ (first field) ... In other words, the video signal VID - 1 apparently becomes the sequential video signal of NTSC system with excellent color framing property. Similarly, the video signals VID - 2 ... VID - 5 become the sequential video signals of NTSC system. As a result, the D/A converters DA - 1 to DA - 5 produce the video signals of NTSC system with 5 phases.

Figure 7:
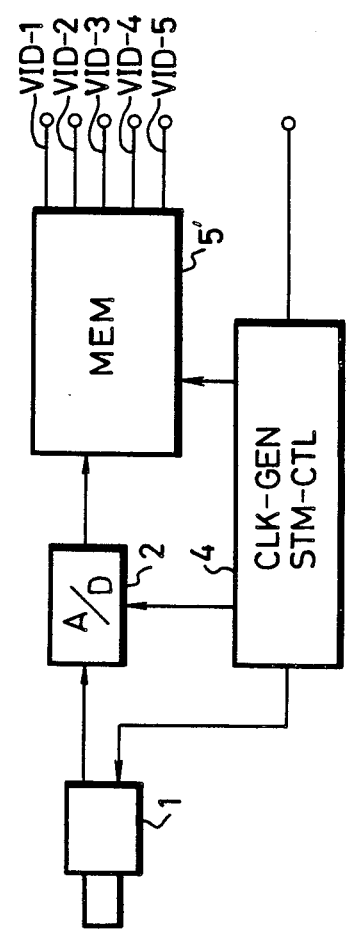
FIG. 7 is a block diagram showing a main part of another embodiment of the recording apparatus according to the present invention.

If the memory 5' in FIG. 7 uses a RAM (random access memory), the writing and the reading can be carried out in a time sharing manner so that 5 field memories are sufficient.

While in the embodiment of FIG. 1 the synchronizing signal is separated from the composite video signal derived from the video camera 1 and then is supplied to the clock signal generating/system control circuit 4, it is also possible that as shown in FIG. 7 the synchronizing signal is generated from the clock signal generating- /system control circuit 4, which then is fed to the video camera 1.

In order that the tape recorded by the above recording apparatus is reproduced by the VTR of the SMPTE type C format, it is necessary that the slant tracks formed on the magnetic tape by five rotary magnetic heads $H_A$ to $H_E$ have each the same characteristic since the channel of the rotary magnetic head and the reproducing circuit of the VTR are made for one channel.

To this end, there is required an apparatus which reproduces the slant tracks recorded on the magnetic tape by the respective rotary magnetic heads $H_A$ to $H_E$, checks the same and adjusts and makes uniform the characteristics of the recording systems relative to the rotary magnetic heads $H_A$ to $H_E$ on the basis of the checked results.

Figure 9A:
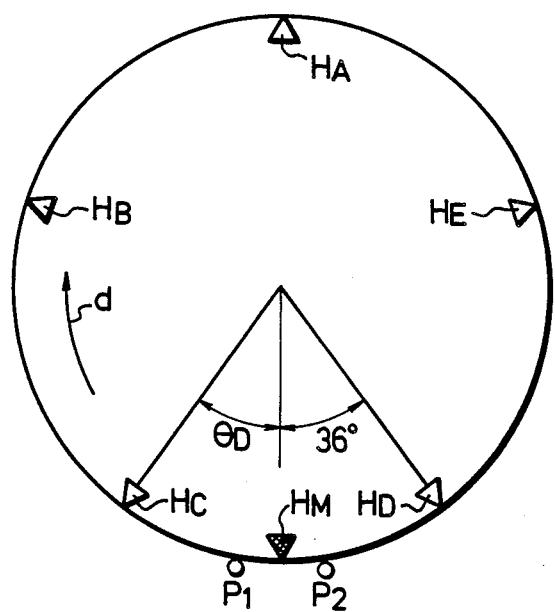
FIGS. 9A and 9B are respectively plan and side views of the tape guide drum used in the recording apparatus shown in FIG. 1 or 7 when a rotation magnetic head for monitor playback is provided.
Figure 9B:
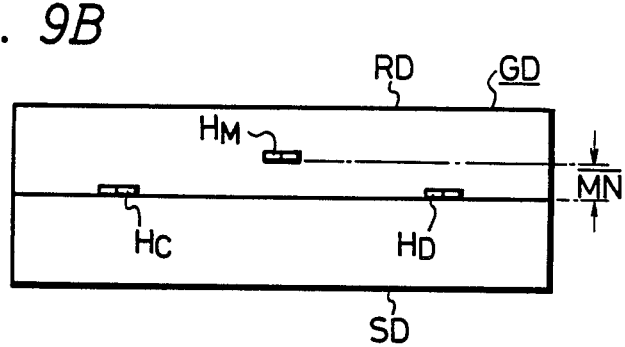

The above detecting/adjusting apparatus will hereinafter be described with reference to FIGS. 9A, 9B and FIG. 10. As shown in FIGS. 9A and 9B, in addition to the rotary magnetic heads $H_A$ to $H_E$ shown in FIG. 3, a rotary magnetic head $H_M$ for monitor playback use is mounted on the rotary drum RD of the tape guide drum GD. In the embodiment of FIG. 9, the rotary magnetic head $H_M$ is substantially centered between the rotary magnetic heads $H_c$ and $H_D$, for example. An angle $\theta_D$ between the heads $H_c$ and $H_M$ is about 36°, and reference letter $\overline{MN}$ designates a stepped length of the head $H_M$ relative to the heads $H_A$ to $H_E$.

Figure 10:
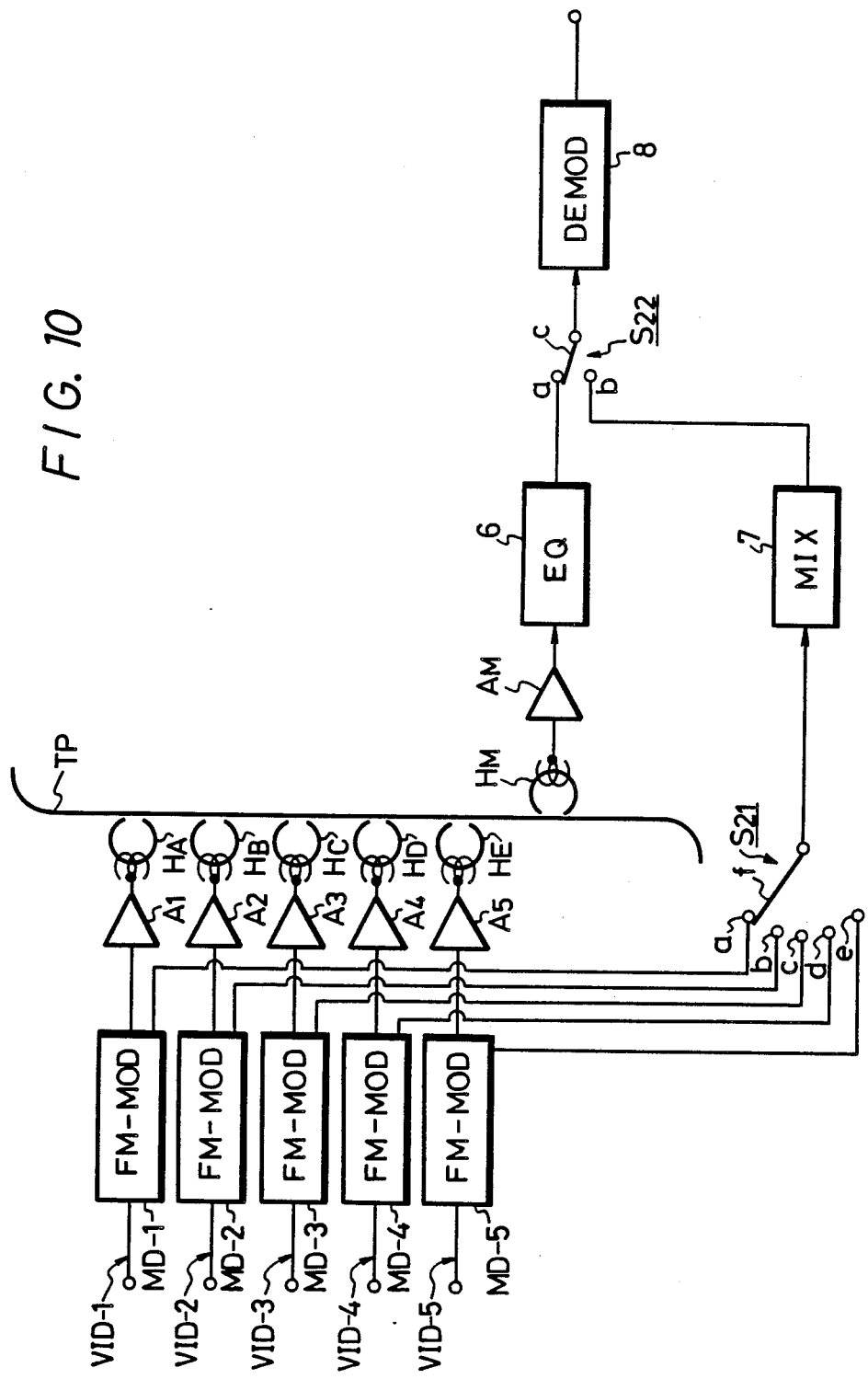
FIG. 10 is a block diagram showing an example of a detecting and adjusting apparatus used in the recording apparatus shown in FIG. 1 or 7.

As shown in FIG. 10, the output terminal of the rotary magnetic head $H_M$ for monitor playback use is connected through an amplifier $A_M$ to the input terminal of a playback equalizer 6, and the output terminal of the playback equalizer 6 is connected to a fixed contact a of a changeover switch $S_{22}$. On the other hand, the output terminals of the frequency-modulators MD - 1 to MD - 5 for the rotary magnetic heads $H_A$ to $H_E$ are respectively connected to fixed contacts a to e of a change-over switch $S_{21}$, and a movable contact f of the change-over switch $S_{21}$ is connected to the input terminal of a mixing circuit 7 which mixes a white reference signal. The output terminal of the mixing circuit 7 is connected to a fixed contact b of the change-over switch $S_{22}$ and a movable contact c thereof is connected to the input terminal of an FM demodulator 8.

The operation of the detecting/adjusting apparatus will be described. At first, the movable contact c of the change-over switch $S_{22}$ is connected to the fixed contact a the standard tape recorded by the VTR of SMPTE C type format is transported at speed five times the normal speed, the tape is reproduced by the rotary magnetic head $H_M$, and then the playback system is adjusted so as to make its characteristic meet with the standard or normalization. Thereafter, a test signal (for example, a white signal) is supplied to each of the FM modulators MD - 1 to MD - 5. Then, the movable contact c of the change-over switch $S_{22}$ is connected to its fixed contact b. In the mixing circuit 7, a reference signal with frequency the same as that of the white signal is inserted into the vertical synchronizing signal intervals of the modulated test signals from the FM modulators MD - 1 to MD - 5. By operating the change-over switch $S_{21}$, the level of the demodulated signal of each channel from the FM demodulator 8 is compared with the level of the reference signal and the gain of the recording system of each channel is adjusted to make the above levels equal to one other.

Thereafter, the movable contact c of the change-over switch $S_{22}$ is connected to its fixed contact a. A test pattern signal is supplied to the resective FM modulators MD - 1 to MD - 5 and the modulated test pattern signals therefrom are sequentially recorded on the magnetic tape TP by the rotary magnetic heads $H_A$ to $H_E$ so as to form the slant tracks. At that time, the rotary magnetic head $H_M$ for monitor playback use (this head $H_M$ can be displaced in the direction substantially perpendicular to the tracing direction) is displaced to trace and reproduce the slant tracks formed by the magnetic heads $H_A$ to $H_E$. In consequence, various characteristics of the recording system of each channel are adjusted so as to make video level, clamp level, preemphasis frequency characteristic, differential gain, differential phase, waveform characteristic and so on of the test pattern signal, which is each demodulated output from the FM-modulator 8, equal to those of the test pattern signal formed by reproducing the standard tape. Thus the characteristics of the recording systems of the rotary magnetic heads $H_A$ to $H_E$ can be made uniform.

Figure 11:
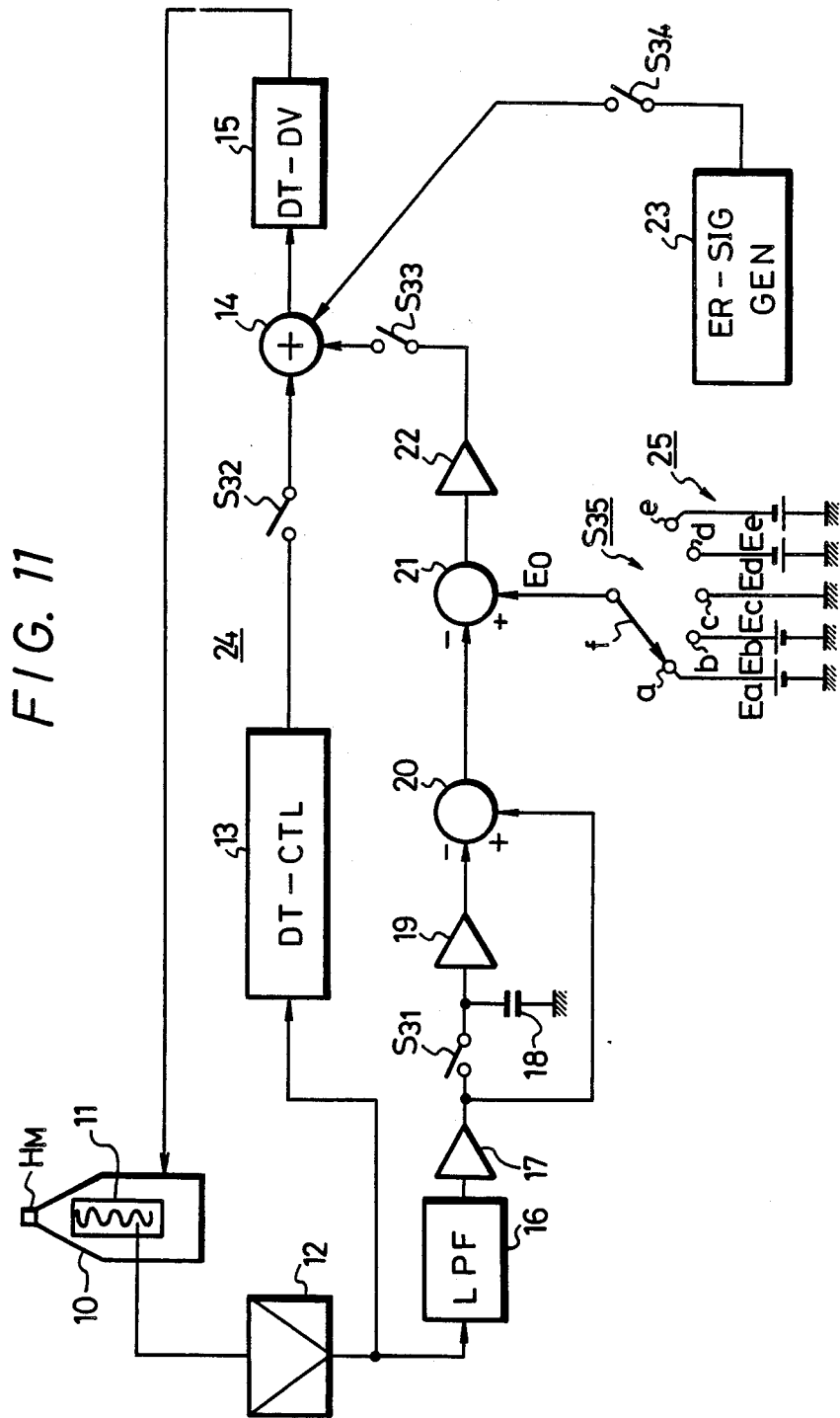
FIG. 11 is a connection diagram showing a bias driving circuit used for the monitor playback rotary magnetic head in the recording apparatus shown in FIGS. 9 and 10.

A drive circuit for displacing the monitor playback rotary magnetic head $H_M$ will be described (FIG. 11). The rotary magnetic head $H_M$ for monitor playback use is mounted through a bimorph plate 10 as the electro-mechanical transducer element to the rotary drum RD of the tape guide drum GD shown in FIG. 9. On this bimorph plate 10 is attached a strain gauge 11 as a mechanical-electric transducer element which detects the displacement of the bimorph plate 10 or the rotary magnetic head $H_M$.

In a dynamic tracking servo circuit 24, displacement detected output from the strain gauge 11 is supplied through an amplifier 12 to a known dynamic tracking control circuit 13 which is used in the VTR of $SMPT_E$ type C format or the like. The control signal from the control circuit 13 is supplied through an on-off switch $S_{32}$, a composer (adder) 14 and a dynamic tracking drive circuit 15 to the bimorph plate 10 as a displacement drive signal.

Further, the displacement detected signal from the amplifier 12 is supplied through a low-pass filter 16, an amplifier 17 and an on-off switch $S_{31}$ to a hold capacitor 18. The terminal voltage across the capacitor 18 is supplied through an amplifier 19 to a composer (subtracter) 20 and thereby subtracted from the output of the amplifier 17. The output from the composer 20 is supplied to other composer (subtracter) 21 and thereby subtracted from a D.C. voltage $E_0$ derived from a movable contact f of a change-over switch $S_{35}$ in a D.C. voltage generating means 25. The output from the composer 21 is supplied through an amplifier 22 and an on-off switch $S_{33}$ to the composer 14 and thereby added to the output from the dynamic tracking control circuit 13. To fixed contacts a to e of the change-over switch $S_{35}$ are respectively applied D.C. voltages Ea ($>0$), Eb ($>0$), Ec ($=0$), Ed ($<0$) and Ee ($<0$).

A reference numeral 23 designates an erase signal generating circuit for generating an attenuation vibrating erase signal which converges to 0V. The erase signal therefrom is supplied through an on-off switch $S_{34}$ to the composer 14.

Figure 12:
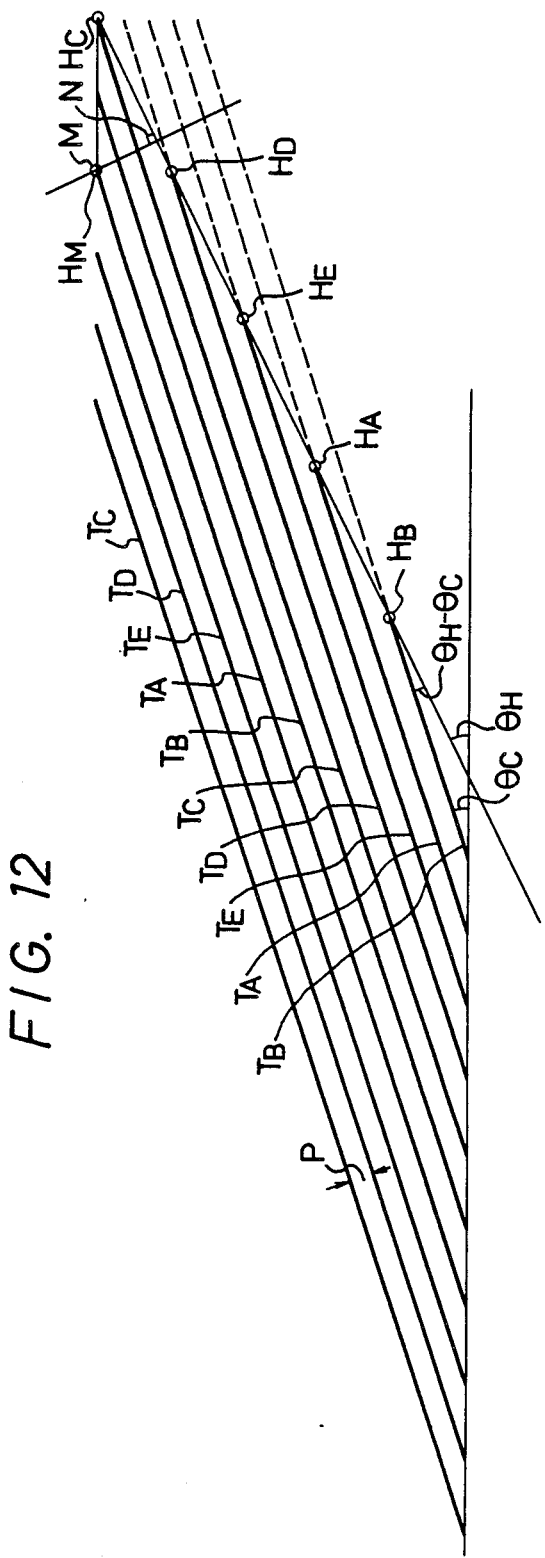
FIG. 12 is a diagram showing a positional relation between the tracks on the tape and the rotary magnetic head useful for explaining the operation of the bias driving circuit shown in FIG. 11.

The operation of the circuit shown in FIG. 11 will be described with reference to FIG. 12. FIG. 12 shows the tracks on the tape and the magnetic heads at some instant in the recording mode, or an instant when the rotary head $H_C$, for example, has just finished tracing one track. In FIG. 12, reference letters $T_A$ to $T_E$ designate tracks respectively traced by the heads $H_A$ to $H_E$, and M designates a neutral position of the playback movable head $H_M$ when the bimorph plate 10 is in the non-bias state. A straight line $\overline{MN}$ designates a line along which the movable head $H_M$ is moved. The position M of the playback movable head $H_M$ is placed on the track $T_A$ traced by the head $H_A$. When the movable head $H_A$ is moved by 2 track pitches along the line $\overline{MN}$ in the positive direction, the position M is on the track $T_D$. When the movable head $H_A$ is moved by one track pitch in the positive direction, the position M is on the track $T_E$. When the movable head $H_A$ is moved by one track pitch in the negative direction, the position M is on the track $T_B$. When the movable head $H_A$ is moved by 2 track pitches in the negative direction, the position M is on the track $T_C$. Thus, the respective tracks can be reproduced. In practice, the position of the movable head $H_M$ is determined in such a manner that the N may be positioned between the tracks $T_D$ and $T_C$ on the track on which the M is positioned. In this case, if the N is positioned at the middle point between the tracks $T_D$ and $T_C$, the line $\overline{MN}$ becomes 2.5 track pitches. In general, the line $\overline{MN}$ is given as $$\overline{MN} \approx 2p + \overline{CN} \tan(\theta_H - \theta_C)$$

where p is the track pitch, C is the position of the head $H_c$, $\theta_H$ is the helix angle and $\theta_C$ is the track angle. In the above equation, if p=0.18 mm and $\overline{CN} \tan(\theta_H - \theta_C) = 0.5$ p, $\overline{MN}$ becomes 0.45 mm.

In FIG. 11, when upon recording mode the switch $S_{32}$ is turned off once to open the dynamic tracking loop and thereafter the switch $S_{34}$ is turned on to apply the erase signal to the bimorph plate 10 of the head $H_M$ whereby the position of the bimorph plate 10 is returned to the neutral position. At that time, the head $H_M$ should trace the track $T_A$. Under this state, the dynamic tracking loop is closed once. At this time, the head $H_M$ traces the track $T_A$ with just tracking. At that time, when the switch $S_{33}$ is turned off and the switch $S_{31}$ is turned on, the output from the lowpass filter 16 is held in the capacitor 18. After the switch $S_{31}$ is turned off and the switch $S_{33}$ is turned on, when the movable contact f of the switch $S_{35}$ is connected to the fixed contact a the voltage Ea corresponding to 2 track pitches of the output from the strain gauge 11 is amplified by the amplifier 22 and then supplied to the circuit 15 so that the output from the strain gauge 11 is substantially made coincident with the voltage Ea. Thus, the head $H_M$ is moved by 2 track pitches to trace the corresponding track.

When the movable contact f of the switch $S_{35}$ is sequentially connected to the fixed contacts b . . . e hereinafter, the head $H_M$ traces the respective tracks $T_A$ to $T_E$.

Figure 13:
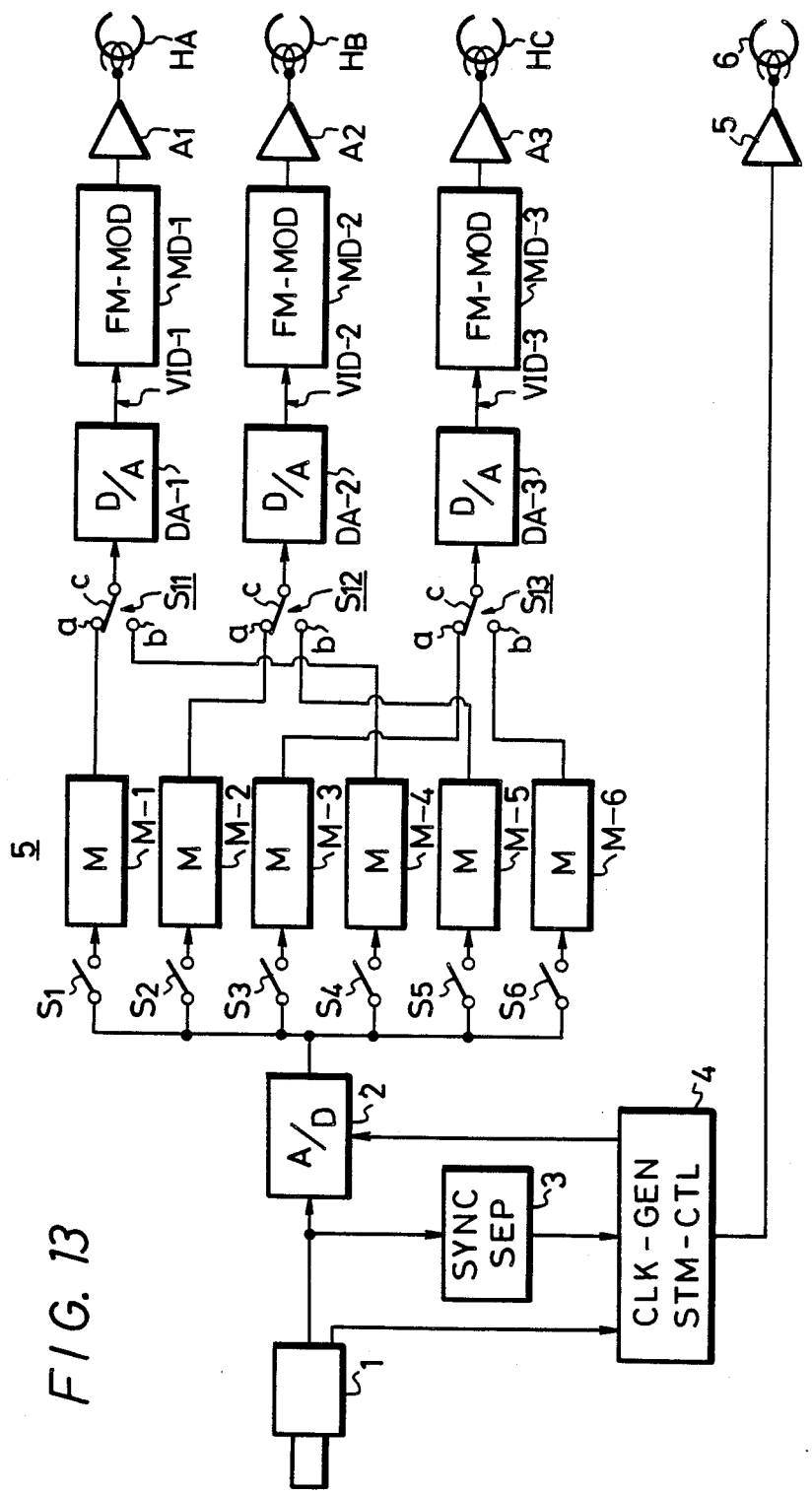
FIG. 13 is a block diagram showing another embodiment of the recording apparatus for recording a video signal obtained from a high speed scanning video camera according to the present invention.

Another embodiment of the recording apparatus for recording a video signal obtained from a high speed scanning camera according to the present invention will hereinafter be described with reference to FIG. 13. In FIG. 13, like parts corresponding to those in FIG. 1 are marked with the same references and will not be described. This embodiment uses a video camera the scanning speed of which is three times the scanning speed of the standard television signal of the NTSC system.

If the subcarrier frequency, horizontal frequency, vertical frequency and frame frequency of the video signal are respectively taken as $f'_{SC}$, $f'_H$, $f'_V$ and $f'_{FR}$, these are expressed as follows:

$$f'_{SC} = \frac{910}{4} \cdot f_H = 10.7 \text{ (MHz)}$$

$$f'_H = \frac{525}{2} \cdot f_V = 47.25 \text{ (kHz)}$$

$$f'_V = 180 \text{ (Hz)}$$

$$f'_{FR} = \frac{1}{2} f_V = 90 \text{ (Hz)}$$

The digitized video signal from the A/D converter 2 is supplied through the on-off switches $S_1$ to $S_6$ to the field memory 5 (including memories M - 1 to M - 6) and written therein with the data rate of the write frequency $f_{W-CK}$. The digitized video signals read out from the field memories M - 1, M - 4; M - 2, M - 5; and M - 3, M - 6 with the data rate of the read frequency $f_{R-CK}$ ($= \frac{1}{3} f_{W-CK}$) are respectively supplied through changeover switches $S_{11}$ to $S_{13}$ (each of which includes the fixed contacts a, b and the movable contact c) to the D/A converters DA - 1 to DA - 3 thereby converted to the form of analog signals in response to the clock signal with the read frequency $f_{R-CK}$. The analog video signals VID - 1 to VID - 3 from the D/A converters DA - 1 to DA - 3 are respectively supplied to frequency modulators MD - 1 to MD - 3 thereby frequency-modulated. The frequency-modulated video signals VID - 1 to VID - 3 are respectively supplied through amplifiers A1 to A3 to three rotary magnetic heads $H_A$ to $H_C$, which are located with an angular distance of 120° between adjacent ones, thereby recorded on the magnetic tape so as to sequentially form adjoining slant tracks.

Figure 14:
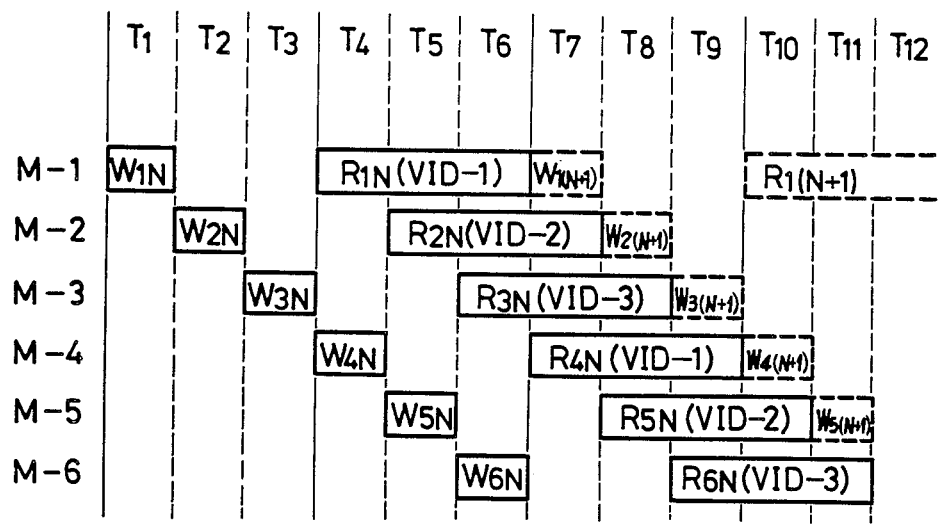
FIG. 14 is a timing chart of write and read timings of a memory useful for explaining the recording apparatus shown in FIG. 13.

The operation of the apparatus shown in FIG. 13 will be described with reference to FIG. 14. In FIG. 14, reference letters $T_1$, $T_2$, $T_3$ . . . designate field periods, each of which has a time width T ($= 1 f'_V$).

During the period $T_1$, only the switch $S_1$ is turned on so that the digitized video signal is written in the memory M - 1. During the next period $T_2$, only the switch $S_2$ is turned on to allow the digitized video signal to be written in the memory M - 2. In like manner, the digitized video signals are sequentially written in the memories M - 3 to M - 6 hereinafter.

In the field period $T_4$, the movable contact of the switch $S_{11}$ is connected to its fixed contact a so that the video signal $W_{1N}$ stored in the memory M - 1 during the field period $T_1$ is started to be read out therefrom. Since $f_{R-CK} = \frac{1}{3} f_{W-CK}$, 3 field periods $T_4$ to $T_6$ are required to read the video signal $W_{1N}$ and to provide the read signal $R_{1N}$.

Similarly, in the field period $T_5$, the video signal $W_{2N}$ stored in the memory M - 2 during the field period $T_2$ is started to be read out therefrom. Also three field periods $T_5$ to $T_7$ are required to read the video signal $W_{2N}$ and to provide the read signal $R_{2N}$. The same operation will be carried out. In the field period $T_{11}$, the movable contact of the switch $S_{11}$ is connected to its fixed contact b so that the video signal $W_{4N}$ stored in the memory M - 4 is read out therefrom to thereby obtain the read signal $R_{4N}$. Thus, when the written digital video signals $W_{1N}$, $W_{2N}$ . . . are controlled to have one field amount from the beginning of each field, the read video signals $R_{1N}$, $R_{2N}$ . . . become such ones as read out from the beginning of each field. Accordingly, the D/A converters DA - 1 to DA - 3 produce 3-phase analog video signals VID - 1 to VID - 3 with a phase distance of $1/f'_V = \frac{1}{3} \cdot 1/f_V$ between adjacent ones.

The video signal VID - 1 consists of the video signals $R_{1N} \to R_{4N} \to R_{1(N+1)} \to \ldots$ which are sequentially read out. If, now, $W_{1N}$ is taken as the video signal of the NTSC system in the first field, $W_{2N}$ becomes the video signal of the second field . . . , $W_{4N}$ the video signal of the fourth field, $W_{5N}$ the video signal of the first field, and $W_{6N}$ the video signal of the second field, . . . Accordingly, the video signal VID - 1 consists of the video signal $R_{1N}$ (first field)→$R_{4N}$ (fourth field)→$R_{1(N+1)}$ (third field)→$R_{4(N+1)}$ (second field)→$R_{1(N+2)}$ (first field) . . . thus the color framing thereof being damaged. Therefore, if the video signals are encoded after being converted in the form of digital to analog signals, it is necessary for the video signal $R_{4N}$ (fourth field). $R_{4(N+1)}$ (second field) . . . to invert the phase of the carrier chrominance signal thereof. The signals VID-2 to VID-3 must undergo the same processing. Accordingly, in this case, if the color encoder which produces the composite color video signal of the NTSC system in the imager 1 is provided with means for inverting the phase of the carrier chrominance signal, signals having no apparent color framing property can be produced as the video signals VID-1 to VID-3.

Consequently, according to the recording apparatus, the color video signal which requires the tracing speed N times the normal value of the NTSC system is produced from the video camera as the form of the component signal and then written in the memory the storage capacity of which is N fields or more. The N-channel component video signals having the normal tracking speed are produced from the memory and then encoded to the signals of the NTSC system to thereby produce the NTSC color video signals. The NTSC color video signals are then supplied to N rotary magnetic heads and the N-channel color video signals are recorded on the magnetic tape so as to form adjoining slant tracks sequentially. In this recording apparatus for recording a video signal obtained from a high speed scanning video camera, if N is $4n+1$ or $4n-1$ (where $n=1, 2, 3, \ldots$), the arrangement of the color encoder becomes different in correspondence therewith. When $N=4n+1$, the color encoder may be an ordinary encoder of the NTSC system. On the other hand, when $N=4n-1$, in order to obtain the color video signal with the color framing property under being recorded on the tape, the color encoder of the NTSC system must be modified so as to invert the phase of the color subcarrier signal of each channel at every field.

In the recording apparatus of the present invention, also when the color video signal of SECAM system is processed, the color encoder must carry out the same color framing operation as that of the color video signal of NTSC system.

For the color video signal of PAL (pase alteration line) system, when $N=8n+1$ (n is an even number in $N=4n+1$) ($n=1, 2, 3, \ldots$), the color encoder may be an ordinary encoder of PAL system. When $N=8n-3$ (n is an odd number in $N=4n+1$) ($n=1, 2, 3, \ldots$), the color encoder must be modified so as to produce the color video signal with the color framing under being recorded on the tape when the color video signal is encoded after being converted in the form of digital to analog signals for the PAL system.

Accordingly, when N is odd number of 3 or above, the arrangement of the color encoder becomes simple. If this simple arrangement of the color encoder is not considered, N may be an even number.

According to the above recording apparatus for recording a video signal obtained from a high speed scanning video camera, a phenomenon moving at high speed can easily be picked up and recorded by use of a television camera and a VTR. The tape recorded by such recording apparatus can be reproduced by the VTR of the normal system, and hence it is possible to obtain the recorded tape which has the compatibility.

When $N=4n\pm 1$ ($n=1, 2, 3, \ldots$), the arrangement of the color encoder is made simple for each television system.

In the above embodiments, the recording apparatus is described, which records the video signal derived from the television or video camera having the line scanning speed three and five times the standard television signal so as to be reproducible by the VTR of SMPTE C type format, or the tape having the compatibility. In this case, various variations and modifications can be considered as the application of the above technical idea. More particularly, it is possible to record the video signal derived from a television camera having a line scanning speed, for example, five times, $5\times 2=10$ times and $5\times 3=15$ times that of the standard television signal. To this end, the television camera must be controlled to make the line scanning speed as $5\times M$ times ($M=1, 2, 3, \ldots$) that of the standard television signal. If the revolution number of the rotary drum is increased M times the normal revolution number with the tape speed five times the normal speed, it is possible to record video signals of various line scanning speeds. In this case, if the revolution number of the rotary drum is made M times the normal revolution number, there is some fear of the aforementioned defects, or corresponding relation between emphasis and deemphasis, difficulty for securing the characteristic of the recording and reproducing circuit and problems of rotary transformer characteristic and the air film or the like. However, the inventor of the present invention ascertains that even if the revolution number of the rotary drum is made three time the normal revolution number, the above defects do not become significant. Whereas, if the revolution number of the rotation drum is made four or above times the normal revolution number, the above defects can not be neglected and can not be compensated for.

Figure 15:
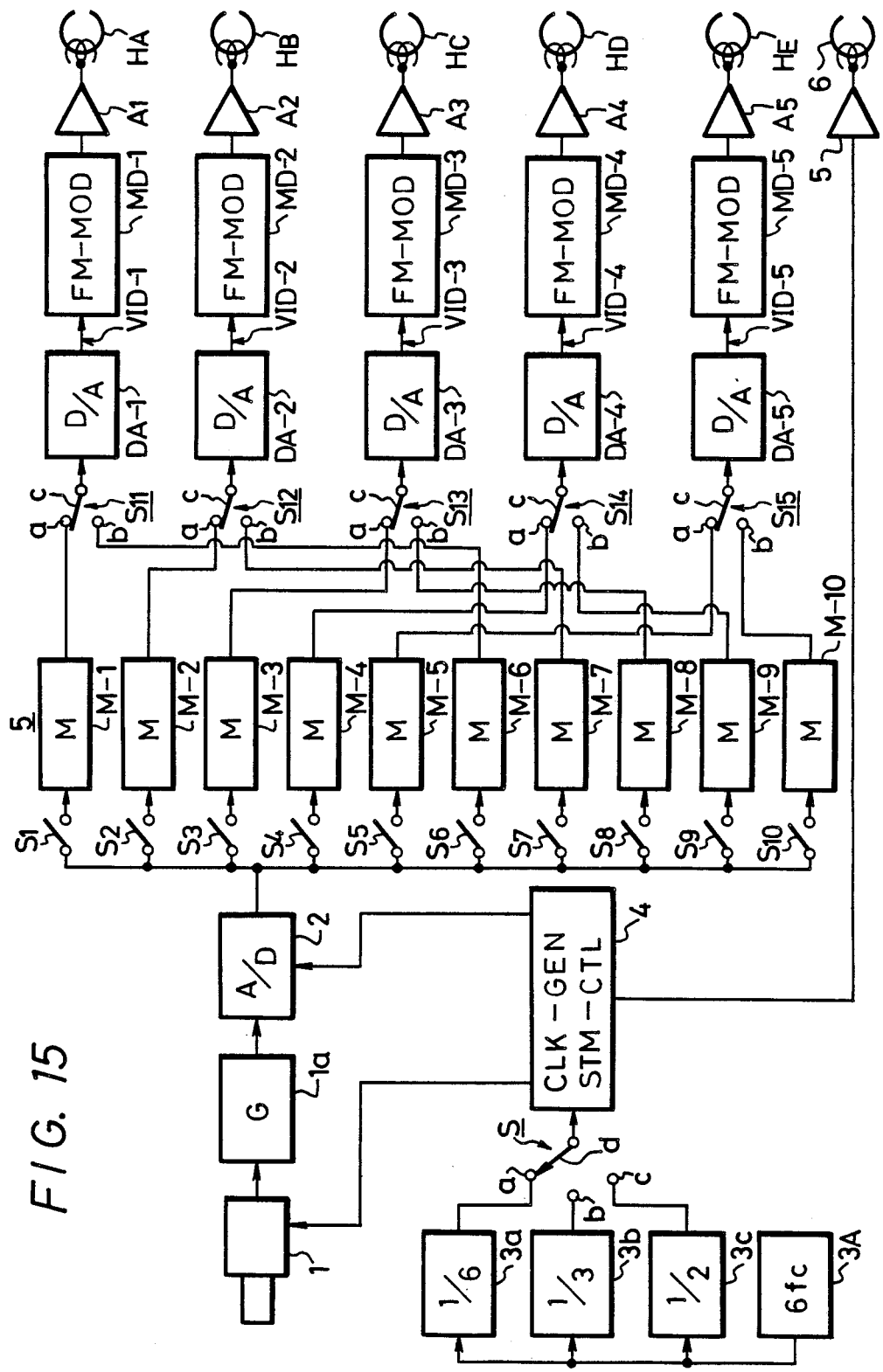
FIGS. 15 and 16 are respectively block diagrams showing further embodiments of the recording apparatus for recording a video signal obtained from a high speed scanning video camera according to the present invention.
Figure 16:
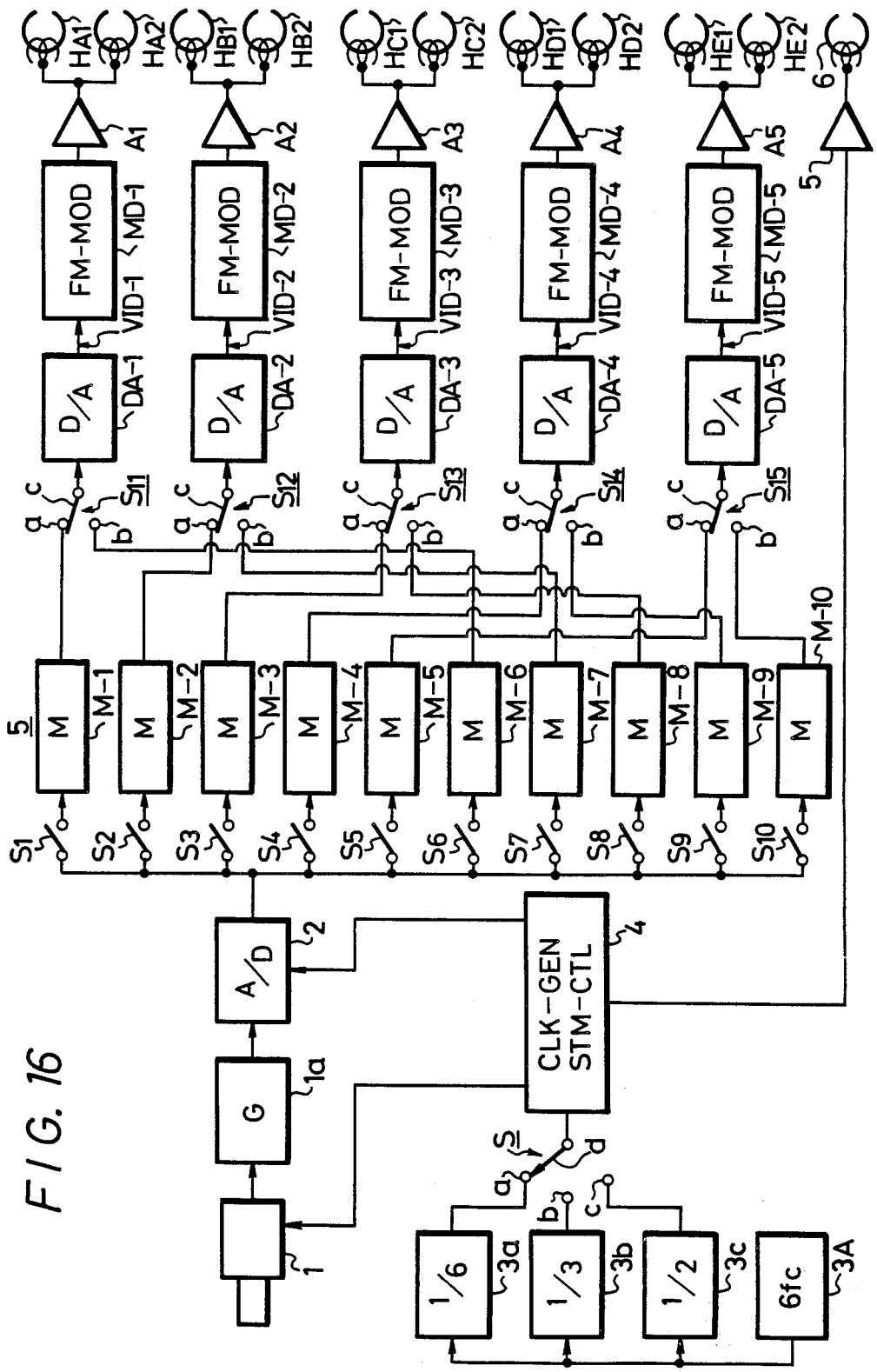

Further embodiments of the recording apparatus for recording a video signal obtained from a high speed scanning video camera according to this invention in which the revolution number of the rotary drum is selectively switched to will hereinafter be described with reference to FIGS. 15 and 16. In FIGS. 15 and 16, except an apparatus for selecting a line scanning speed of a television camera, like parts corresponding to those in FIG. 1 are marked with the same references and will not be again described.

According to the embodiment shown in FIG. 15, the recording apparatus comprises memory means for storing a video signal derived from a video camera the scanning speed $M\cdot N\cdot S_n$ of which is $M\cdot N$ (where M and N are natural numbers) times the scanning speed $S_n$ of the standard television signal and N rotary magnetic heads supplied with video signals of N channels read out in parallel from the memory means to have the scanning speed $M\cdot S_n$ which is M times the scanning speed $S_n$ of the standard television signal and rotating at a revolution number M times the normal revolution number wherein the value of M in the scanning speed $M\cdot N\cdot S_n$ of the video camera is changed in multiple stages, the revolution number of the rotary magnetic heads is changed in multiple stages in accordance with the change of the value of M, and the video signals of N-channels are recorded on the magnetic tape by N rotary magnetic heads so as to sequentially form adjoining slant tracks.

According to the embodiments shown in FIG. 16, the recording apparatus comprises memory means for storing a video signal derived from a video camera the scanning speed M·N·Sn of which is M·N (where M and N are natural numbers) times the scanning speed Sn of a standard television signal and, MN, for example 2N (m is a natural number), rotary magnetic heads supplied with video signals of N-channels read out in parallel from the memory means to have the scanning speed M·Sn M times the scanning speed Sn of the standard television signal and rotating at a revolution number M/2, M/m, for example times the field number of the standard television system, wherein the scanning speed M·N·Sn the video camera is changed in multiple stages by changing the value of M, the revolution number of the rotary magnetic heads is changed in multiple stages in accordance with the change of the value of M, and the video signals of N-channels are recorded on the magnetic tape by the 2N rotation magnetic heads so as to sequentially form adjoining slant tracks.

According to the embodiments shown in FIGS. 15 and 16, the phenomenon moving at high speed can easily be picked up and recorded by using the television camera and the VTR. And, the line scanning speed of the television camera can be changed in accordance with the moving phenomenon.

The embodiments of the recording apparatus according to the present invention shown in FIGS. 15 and 16 will hereinafter be described in detail.

In FIG. 15, a reference numeral 1 designates an imager or a video camera which includes an image element such as a pickup tube, a solid state image element or the like, a driving means therefor, a signal processing circuit and so on. In this case, the video camera 1 also includes an encoder which produces a composite color video signal of NTSC system. However, it is possible that such encoder is provided in the signal processing circuit system (at the next stage of, for example, D/A converter which will be described later) of the later stage of the video camera 1.

The composite color video signal from the video camera 1 is supplied through a gain change-over circuit 1a to an A/D converter 2 thereby digitized. A reference numeral 4 designates a clock signal generating/system control circuit which produces a clock signal and a control signal including various synchronizing signals and color framing and which controls the whole system. An oscillatory signal with the frequency of $6f_c$ from a reference oscillator 3A is supplied to frequency dividers 3a, 3b and 3c the frequency dividing ratios of which are respectively 1/6, ⅓ and ½ and thereby frequency-divided. The reference clock signals with the frequencies $f_c$, $2f_c$ and $3f_c$ are selected by a switch S (having fixed contacts a, b, c and a movable contact d) and then supplied to the circuit 4. Also, the gain of the gain change-over circuit 1a is switched to in response to the switching of the switch S.

Another embodiment of the recording apparatus will be described with reference to FIG. 16. In this case, the rotary magnetic heads $H_A$ to $H_E$ shown in FIG. 1 or 15 are respectively replaced with pairs of rotary magnetic heads $H_{A1}$, $H_{A2}$; ~; $H_{E1}$, $H_{E2}$. In FIG. 16, like parts corresponding to those in FIG. 1 or 15 are marked with the same references and will not be again described. In this embodiment, there is used a video camera the scanning speed of which is 5M times, or 5, 10 and 15 times the scanning speed Sn of the standard television signal of the NTSC system, namely, the scanning speeds 5Sn, 10Sn and 15Sn of the multiple stages.

The frequency-modulated video signals from the frequency modulators MD - 1 to MD - 5 are respectively supplied through the amplifiers $A_1$ to $A_5$ to the five pairs of rotary magnetic heads $H_{A1}$, $H_{A2}$; ~; $H_{E1}$, $H_{E2}$ simultaneously or selectively. On the magnetic tape are sequentially formed 5 adjoining slant tracks by the heads $H_{A1}$ to $H_{E1}$ and 5 slant tracks $H_{A2}$ to $H_{E2}$ alternately.

Figure 17:
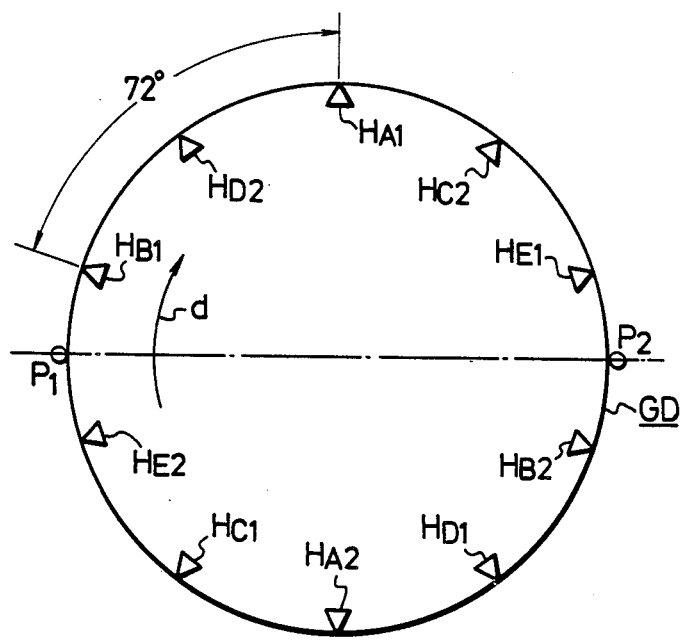
FIG. 17 is a plan view illustrating the tape guide drum of the apparatus shown in FIG. 16.

FIG. 17 shows the arrangement of the rotary magnetic heads $H_{A1}$, $H_{A2}$; ~; $H_{E1}$, $H_{E2}$. The rotary magnetic heads $H_{A1}$, $H_{A2}$; ~; $H_{E1}$, $H_{E2}$, the heads of each pair having an angular distance of 180° therebetween are respectively mounted on the rotary drum RD of the tape guide drum GD with an angular distance of 72° and rotated one revolution at each $2/Mf_v$, or $30M$ (Hz) in the clockwise direction in accordance with the value M/2. A tape to be recorded is wrapped around the tape guide drum GD along its external periphery from the point $P_2$ to the point $P_1$ in the counter-clockwise direction. The tape wrapping angle is selected to be about 180° or above. The tape transport speed is selected to be 5M times the normal value $v_t$ of the normal transport.

The diameter of the tape guide drum GD is selected in such a manner that the relative speed between the head and the tape become equal to that of the case in which there are provided five rotary magnetic heads. And, if a tape to be recorded so as to have a track pattern which can be reproduced by a standard 2-head type VTR is formed and reproduced by the standard VTR at normal playback speed, the phenomenon moving at high speed can be reproduced in slow motion mode.

In this embodiment, when the monitor playback rotary magnetic head is provided, it is possible to use a pair of rotary magnetic heads (movable head) having an angular spacing of 180° therebetween.

As set forth above, according to the present invention, it is possible to obtain the recording apparatus for recording a video signal obtained from a high speed scanning video camera which can easily pick up and record the phenomenon moving at high speed by using the television camera and VTR.

According to the embodiments shown in FIGS. 15 and 16, it is possible to obtain the recording apparatus which can easily pick up and record the phenomenon moving at high speed by using the television camera and VTR and which can record the phenomenon moving at high speed with an optimum recording frequency meeting the speed of the high speed moving phenomenon.

According to the embodiment shown in FIG. 16, when 2N rotary magnetic heads are rotated at revolution number M/2 times the standard revolution number, the rotary magnetic heads can trace the magnetic tape with a contact larger angle than that provided when N rotary magnetic heads are rotated at a revolution number M times the standard revolution number. Thus, it is possible to widen the speed range of the playback to different speeds at which the stable picture can be reproduced.

The above description is given on the preferred embodiments of the invention, but it will be apparent that many modifications and variations could be effected by one skilled in the art without departing from the spirit or scope of the novel concepts of the invention, so that the scope of the invention should be determined by the appended claims only.

I claim as my invention:

1. Apparatus for recording on a magnetic recording tape a video signal obtained from a high speed scanning video camera having a scanning speed N times the scanning speed of a standard video camera generating a standard television video signal, where N is a natural number equal to 3 or more; said apparatus comprising:
    means for driving said magnetic recording tape continuously at a tape speed N times that of a standard type video signal recording apparatus;
    means for converting said video signal to a digital video signal;
    means for dividing said digital video signal into a plurality of channels of digital video signals;
    means for expanding a time axis of each of said plurality of channels of digital video signals;
    means for converting each of said time-axis-expanded digital video signals to an analog video signal so that each of said analog video signals has the same frequency band as that of said standard television video signal;
    means for modulating said analog video signals; and
    means including a rotating drum having a cylindrical surface and N magnetic transducer heads mounted on said cylindrical surface for recording said modulated analog video signals on successive video tracks formed on said recording tape, said rotating drum having a diameter and said recording tape defining a helix angle respectively smaller and larger than the drum diameter and tape helix angle of said standard type video signal recording apparatus, so that said successive video tracks are made to correspond to those of said standard type video signal recording apparatus and said modulated analog video signals as recorded are compatible with said standard type video signal recording apparatus.

2. Apparatus according to claim 1, in which said drum diameter D of said recording apparatus is given as $$D = \frac{\sqrt{h^2 + (L\cos\theta c - NVt)^2}}{\sqrt{h^2 + (L\cos\theta c - Vt)^2}} \cdot Dc$$

wherein
h: length of a video track in a width direction of a tape,
L: video track length of a standard recording apparatus,
$\theta c$: video track angle
Dc: a diameter of a drum of a standard type recording apparatus.
Vt: tape speed of a standard type recording apparatus, and said helix angle ($\theta_H$) is given as $$\theta_H \approx \sin^{-1}\frac{1}{\sqrt{1 - 2N\frac{Vt}{h}\cos\theta c}}$$

3. Apparatus for recording on a magnetic tape a video signal obtained from a high speed scanning video camera having a scanning speed NM times the scanning speed of a standard video camera generating a standard television video signal, where N and M are natural numbers such that their product is 3 or more; said apparatus comprising:
    means for changing the value of M;
    means for driving said magnetic recording tape continuously at a tape speed MN times that of a standard type video signal recording apparatus;
    means for converting said video signal to a digital video signal;
    means for dividing said digital video signal to a plurality of channel digital video signals;
    means for expanding the time axis of each of said plurality of channel digitial video signals;
    means for converting each of said time-axis-expanded digital video signals to an analog video signal so that each of said analog video signals has the same frequency band as that of said standard television video signal;
    means for modulating said analog video signals;
    means including a rotating drum having a cylindrical surface and N magnetic transducer heads mounted on said cylindrical surface for recording said modulated analog video signals on successive video tracks formed on said recording tape, said rotating drum having a diameter and said recording tape defining a helix angle respectively smaller and larger than the drum diameter and tape helix angle of said standard type video signal recording apparatus, so that said successive video tracks are made to correspond to those of said standard type video signal recording apparatus and said modulated analog video signals as recorded are compatible with said standard type video signal recording apparatus; and
    means for driving said rotating drum at a rotating speed M times the rotating speed of said standard type video signal recording apparatus.

4. Apparatus according to claim 1, further comprising reproducing means including a bimorph leaf; a reproducing head mounted on said bimorph leaf; and a dynamic tracking signal generator for controlling said bimorph leaf so that it traces said successive video tracks when said tape is driven at said tape speed of said standard type video recording apparatus.

5. Apparatus according to claim 4, in which said dynamic tracking signal generator comprises N direct current voltage sources, said N voltage sources respectively having DC voltage potentials that differ from one another and a selecting device for selecting one of said N voltage sources and supplying the same to said bimorph leaf.

* * * * *

UNITED STATES PATENT AND TRADEMARK OFFICE
CERTIFICATE OF CORRECTION

PATENT NO. : 4,785,358

DATED : November 15, 1988

INVENTOR(S) : Takeshi Ninomiya

It is certified that error appears in the above-identified patent and that said Letters Patent is hereby corrected as shown below:

Column 1, line 63 and 64, change "substantialy" to --substantially--.

Column 2, line 34, change "compat-ibility" to --compatibility--;
line 45 and 46, "OBJECTS AND SUMMARY OF THE INVENTION" should be indented as new title.

Column 3, line 7 after "sequentially" insert --.--.

Column 4, line 62, change "frequenc" to -- frequency--.

Column 5, line 43, change "threfrom" to --therefrom--;
line 44, delete "(";
line 67, change "$W_{1N}$is" to --$W_{1N}$ is--.

Column 6, line 13, "FIGS. 3A" Should be new paragraph;
line 19, delete "," first occurence;
line 26, change "$V_2$" to --$V_t$--.

Column 8, line 18, "five field periods" should not be in italics;
line 21, change "Thd 3" to --$T_3$--.

Column 9, line 48, after "a" insert --,--.

Column 10, line 1, change "resective" to --respective--;
line 33, change "$SMPT_E$" to --SMPTE__.

Column 11, line 11, change "positioh" to --position--;
line 42, after "a" insert --,--.

UNITED STATES PATENT AND TRADEMARK OFFICE
CERTIFICATE OF CORRECTION

PATENT NO. : 4,785,358

DATED : November 15, 1988

INVENTOR(S) : Takeshi Ninomiya

It is certified that error appears in the above-identified patent and that said Letters Patent is hereby corrected as shown below:

Column 12, line 29, change "A1 to A3" to --$A_1$ to $A_3$--;
    line 37, change "(=1f"v)" to --(=1/f"v)--.

Column 12, line 47, change "$W_{1N}$stored" to --$W_{1N}$ stored--;
    line 50, change "$W_{1N}$and" to --$W_{1N}$ and--.

Column 13, line 10, change "N+2)" to --(N+2)--;
    line 14, change "." to --,--;
    line 16, after "The" insert --video--;
  same line, change "VID⊦2" to --VID-2--;
    line 17, change "VID-③" to --VID-3--;
    line 20, change "①" to --1--;
    line 23, change "VID-① to VID-③" to --VID-1 to VID-3--.

Column 15, line 8, after "and" delete ",".
    line 14, change "M/2, M/m, for example" to
      --M/m, for example M/2,--

UNITED STATES PATENT AND TRADEMARK OFFICE
CERTIFICATE OF CORRECTION

PATENT NO. : 4,785,358

DATED : November 15, 1988

INVENTOR(S) : Takeshi Ninomiya

It is certified that error appears in the above-identified patent and that said Letters Patent is hereby corrected as shown below:

Column 15, line 53, change "1/6" to -- $\frac{1}{6}$ --.

Signed and Sealed this

Twelfth Day of September, 1989

*Attest:*

DONALD J. QUIGG

*Attesting Officer*   *Commissioner of Patents and Trademarks*